(12) United States Patent
Miller et al.

(10) Patent No.: US 7,814,003 B2
(45) Date of Patent: Oct. 12, 2010

(54) BILLING WORKFLOW SYSTEM FOR CREDITING CHARGES TO ENTITIES CREATING DERIVATIVES EXPOSURE

(75) Inventors: Harold Miller, London (GB); Julian Mark Toghill, London (GB); Tuan Pham, London (GB)

(73) Assignee: JP Morgan Chase, New York, NY (US)

( * ) Notice: Subject to any disclaimer, the term of this patent is extended or adjusted under 35 U.S.C. 154(b) by 1274 days.

(21) Appl. No.: 10/774,357

(22) Filed: Feb. 6, 2004

(65) Prior Publication Data

US 2005/0131804 A1    Jun. 16, 2005

Related U.S. Application Data

(60) Provisional application No. 60/529,498, filed on Dec. 15, 2003.

(51) Int. Cl.
*G06F 17/60* (2006.01)
(52) U.S. Cl. .............................. 705/38; 705/30; 705/40
(58) Field of Classification Search ........................ None
See application file for complete search history.

(56) References Cited

U.S. PATENT DOCUMENTS

| | | | |
|---|---|---|---|
| 3,653,480 A | 4/1972 | Yamamoto et al. |
| 4,205,780 A | 6/1980 | Burns et al. |
| 4,264,808 A | 4/1981 | Owens et al. |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,694,397 A | 9/1987 | Grant et al. |
| 4,700,055 A | 10/1987 | Kashkashian, Jr. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |

(Continued)

FOREIGN PATENT DOCUMENTS

EP    421808    4/1991

(Continued)

OTHER PUBLICATIONS

MEGA, the Multi-Entity General Accounting solution, http://www.intacct.com/mega_overview.html.

(Continued)

*Primary Examiner*—Thomas Dixon
*Assistant Examiner*—Gerald C Vizvary
(74) *Attorney, Agent, or Firm*—Lowenstein Sandler PC

(57) ABSTRACT

An automated billing workflow system receives credit valuation adjustment (CVA) amounts associated with derivatives trades. The automated billing workflow system interacts with an Accounting System in order to make appropriate Profit and Loss (P&L) entries for the CVA amounts. The CVA amounts are billed to the business units which actually created the risk. The invention employs a plurality of Workflow Queues. As an item makes it way through the billing workflow, it may be slotted in one or more of these queues where further action will take place.

17 Claims, 3 Drawing Sheets

U.S. PATENT DOCUMENTS

| | | |
|---|---|---|
| 4,931,793 A | 6/1990 | Fuhrmann et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,225,978 A | 7/1993 | Petersen |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,729,594 A * | 3/1998 | Klingman ................ 379/93.12 |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikoff |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |

| Patent No. | Date | Inventor |
|---|---|---|
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Craig |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,052,674 A | 4/2000 | Zervides et al. |
| 6,058,379 A * | 5/2000 | Odom et al. ............... 705/37 |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | Mac Farlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 * | 5/2001 | Shkedy ............... 705/1 |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,858 B1 | 10/2001 | Mosler et al. |
| 6,321,212 B1 | 11/2001 | Lange |
| 6,324,524 B1 | 11/2001 | Lent et al. |
| 6,336,103 B1 * | 1/2002 | Baker ............... 705/36 R |
| 6,338,047 B1 | 1/2002 | Wallman |
| 6,338,049 B1 | 1/2002 | Walker et al. |
| 6,343,279 B1 | 1/2002 | Bissonette et al. |
| 6,347,307 B1 * | 2/2002 | Sandhu et al. ............ 705/36 R |
| 6,363,364 B1 | 3/2002 | Nel |
| 6,363,365 B1 | 3/2002 | Kou |
| 6,374,235 B1 | 4/2002 | Chen et al. |
| 6,393,409 B2 | 5/2002 | Young et al. |
| 6,405,173 B1 | 6/2002 | Honarvar et al. |
| 6,415,259 B1 * | 7/2002 | Wolfinger et al. ............... 705/8 |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,446,072 B1 | 9/2002 | Schulze et al. |
| 6,490,568 B1 | 12/2002 | O'Mara et al. |
| 6,493,685 B1 | 12/2002 | Ensel et al. |
| 6,535,896 B2 | 3/2003 | Britton et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,704,714 B1 | 3/2004 | O'Leary et al. |
| 6,721,715 B2 | 4/2004 | Nemzow |
| 6,825,940 B1 | 11/2004 | Wu et al. |
| 6,954,896 B1 | 10/2005 | Dodrill et al. |
| 6,970,259 B1 | 11/2005 | Lunt et al. |
| 6,970,855 B2 | 11/2005 | Das et al. |
| 7,062,456 B1 | 6/2006 | Riehl et al. |
| 7,104,443 B1 | 9/2006 | Paul et al. |
| 7,177,836 B1 | 2/2007 | German, et al. |
| 2001/0011222 A1 | 8/2001 | Mclauchlin et al. |
| 2001/0018666 A1 | 8/2001 | Sugiyama et al. |
| 2001/0018739 A1 | 8/2001 | Anderson et al. |
| 2001/0032139 A1 | 10/2001 | Debonnett, Jr. |
| 2001/0034663 A1 * | 10/2001 | Teveler et al. ............... 705/26 |
| 2001/0037309 A1 | 11/2001 | Vrain |
| 2001/0047334 A1 | 11/2001 | Nappe et al. |
| 2001/0047489 A1 | 11/2001 | Ito et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0038363 A1 | 3/2002 | MacLean |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | Mackay |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0138390 A1 * | 9/2002 | May ............... 705/37 |
| 2002/0138398 A1 | 9/2002 | Kalin et al. |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 * | 12/2002 | Dhir ............... 705/37 |
| 2002/0199182 A1 | 12/2002 | Whitehead |

| | | | |
|---|---|---|---|
| 2003/0018557 | A1 | 1/2003 | Gilbert et al. |
| 2003/0037002 | A1 | 2/2003 | Higgins et al. |
| 2003/0046218 | A1 | 3/2003 | Albanese et al. |
| 2003/0097335 | A1 | 5/2003 | Muskowitz et al. |
| 2003/0105641 | A1 | 6/2003 | Lewis |
| 2003/0110442 | A1 | 6/2003 | Battle |
| 2003/0120686 | A1 | 6/2003 | Kim et al. |
| 2003/0130945 | A1 | 7/2003 | Force et al. |
| 2003/0130952 | A1 | 7/2003 | Bell et al. |
| 2003/0187789 | A1 | 10/2003 | Karas et al. |
| 2003/0191710 | A1 | 10/2003 | Green et al. |
| 2003/0208421 | A1 | 11/2003 | Vicknair et al. |
| 2003/0208441 | A1 | 11/2003 | Poplawski et al. |
| 2003/0225663 | A1 | 12/2003 | Horan et al. |
| 2003/0233305 | A1 | 12/2003 | Solomon |
| 2003/0237046 | A1 | 12/2003 | Parker et al. |
| 2004/0064409 | A1 | 4/2004 | Kight et al. |
| 2004/0078328 | A1 | 4/2004 | Talbert et al. |
| 2004/0133516 | A1 | 7/2004 | Buchanan et al. |
| 2004/0201735 | A1 | 10/2004 | Baron |
| 2004/0228514 | A1 | 11/2004 | Houle et al. |
| 2005/0033690 | A1 | 2/2005 | Antognini et al. |
| 2005/0097050 | A1 | 5/2005 | Orcutt |
| 2005/0144059 | A1 | 6/2005 | Schuessler |
| 2005/0177480 | A1 | 8/2005 | Huang |
| 2006/0106650 | A1 | 5/2006 | Bush |

FOREIGN PATENT DOCUMENTS

| | | |
|---|---|---|
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Anonymous; Visa & Carnegie Mellon Plan Online Payment Scheme, Newsbyte News Network, Feb. 15, 1995.
Goode; On Profit, Loss and the Mysteries of the Mind, The New York Times, Nov. 5, 2002.
Fidelity Helps Fund Sellers Trim the Taxes They'll Owe, The Wall Street Journal, Nov. 7, 2002.
Zuckerman; The Hedge-Fund Craze, The Wall Street Journal, Jun. 12, 2002.
Harsh Truth: Your Investments Likely Won't Make Any Money.
McDonald; The Stars in the Sky Flicker, and Fund Stars Do the Same, the Wall Street Journal, Jan. 15, 2003.
Maher and Troutman; Provider's Prescription for Painless Migration to Receipt of Electronic Healthcare Payments and Remittance Advices, PNC Bank, Dec. 2001.
Maher and Troutman; Payor's Prescription for Painless Migration to Electronic Healthcare Payments and Remittance Advices, PNC Bank, Dec. 2001.
Ces/Nabanco Introduces Stored Value Card Technology Blockbuster Video Is First Merchant Partner, Business Wire, Inc., Jan. 15, 1996.
First Data Markets Stored-Value Cards, Cards International, Jan. 30, 1996, p. 5.
Norris; First Data Unit Develops Blockbuster Cash Card, Omaha World Hearld Sunrise Edition, Business Section, Jan. 19, 1996, p. 16.
Blockbuster Running Test of a Stored Value Card, The American Banker, Sep. 1, 1995.
Financial News; Wells Fargo Rolls Out Nationwide Lockbox Check Conversion, PR Newswire Association, Apr. 22, 2003.
Malhotra; Clearing House Enumerates E-Payments Ills, The American Banker, vol. 167, No. 154, Aug. 23, 2002.
Card Flash Daily Payment Card News, WWW.CARDWEB.COM, Printed Sep. 23, 2004.
Nokia Announces the World's First NFC Enabled Mobile Product for Contactless Payment and Ticketing, Prnewswire, Feb. 9, 2005.
Annual Report Pursuant to Sectin 13 or 15(D) of the Securities Exchange Act of 1934, Form 10-K, Intelidata Technologies Corporation, Fiscal Year Ended Dec. 31, 2001.
Technology, in Brief Wachovia-Intelidata Deal, May 7, 2002.
French; Tech Stocks: Market Movers, Investors Worry Checkfree Being Chased From its Own Game, HTTP://WWW.THESTREET.COM, Jun. 20, 2002.
Money, Initial Launch to 200 Credit Unions, USA TODAY.COM, Jun. 27, 2002.
Bills; Chase Pact Done, What's Next for Web Vendors?, The American Banker, Technology Section, Jun. 3, 2002, p. 23.
Anonymous; Chase Manhattan Introduces New Fedi Payables Product, Proquest Document Id: 7806951, ISSN/ISBN: 02686635, May 1995.
Marjanovic; Corporate Services: Chase Gears Up Global Payments System Series: 16, The American Banker, vol. 160, Issue 174, Sep. 11, 1995, p. 41.
Anonymous; Operating in a Multi-Currency Environment, Proquest Document Id 9215937, ISSN/ISBN 09589309, Oct. 1995.
Reinbach; Chase Steps Up Treasury System, Proquest Documednt Id 8723558, ISSN/ISBN: 10459472, Nov. 1995.
Anonymous; Chasing the Global Trend, Cash Management News, Proquest Document Id 9319923, ISSN/ISBN: 02686635, Dec. 1995.
Gluck; Creating a Global Cash-Management Game Plan, Bank Systems & Technology, Feb. 1997, p. 28.
Anonymous; Systems Spell Change for Foreign Exchange, Global Investor, Proquest Document Id 1056152B, ISSN/ISBN: 09513604, Nov. 1996.
Decovny; Net Scope, Banking Technology, May 1997.
Press Release, Mar. 5, 2004, Payment Data Systems Files Patent on Debit Card Payment Solution, American City Business Journals, Inc., Mar. 5, 2004.
Lamond; Credit Card Transactions Real World and Online, Paying by Credit Card-Real World and Online, HTTP://WWW.VIRTUALSCHOOL.EDU/MON/ELECTRONICPROPERTY/KLAMOND/CREDIT, Printed Jul. 8, 2005, 17 Pages.
Carreker; Electronic Check Presentment: Capturing New Technology, HTTP://PROQUEST.UMI.COM, Banking Management, Rolling Meadows: vol. 71, Issue 2, Mar./Apr. 1995, p. 32, 5 Pages.
Du Pont's Electronic Payments, Corporate EFT Report, V9, N1, Dialog File 636, Accession No. 01066902, Jan. 11, 1989.
Dialog File 20, #10279554; Offer: Book Yourself Free Cassettes; Mar. 25, 2000; Birmingham Post, p. 16.
Terrie Miller and Henry Yan; When Custody Governs, Benefits Canada, Toronto, Feb. 1998, vol. 22, Issue 2, p. 33, 5 pages.

* cited by examiner

BILLING WORKFLOW SYSTEM FOR CREDITING CHARGES TO ENTITIES CREATING DERIVATIVES EXPOSURE

CROSS REFERENCE TO RELATED APPLICATIONS

This application claims the benefit of U.S. Provisional Application Ser. No. 60/529,498, filed by Miller et al. on Dec. 15, 2003 and entitled "Billing Workflow System For Crediting Charges to Entities Creating Derivatives Exposure", which is incorporated herein by reference.

FIELD OF THE INVENTION

The present invention relates generally to automated billing systems, and, more particularly, to an automated billing workflow system for crediting charges to entities creating derivatives exposure.

BACKGROUND OF THE INVENTION

Although profitable, trading in derivatives involves some degree of risk. For example, traders may act as market makers for certain derivatives and, in accumulating inventory, develop positions that result in market risk. The main risk is represented by the possibility of counterparty default, the estimation of which, on a per deal basis, is called the credit charge or bill (on the day of deal inception) and credit reserve movement (on following days, up to the expiration date of the deal).

Various analytical models exist that allow investment banks to estimate the risk associated with particular derivatives. Although it is possible to make estimates as to the risk and calculate an amount of reserve to set aside, one of the problems has been that financial institutions fail to appropriately credit an amount of the exposure to the actual business unit and trade creating the risk.

SUMMARY OF THE INVENTION

An automated billing workflow system receives reserve information associated with derivatives trades. The automated billing workflow system interacts with an Accounting System to make appropriate Profit and Loss (P&L) entries for reserve amounts. The reserve amounts are then billed to the business units that actually created the derivatives exposure.

The invention employs a plurality of Workflow Queues. As an item makes it way through the billing workflow, it may be slotted in one or more of these queues where further action will take place. This arrangement allows various employees to review the charges to determine whether they are appropriate, and to make adjustments before the amount is actually billed.

These and other aspects, features and advantages of the present invention will become apparent from the following detailed description of preferred embodiments, which is to be read in connection with the accompanying drawings.

DESCRIPTION OF PREFERRED EMBODIMENTS

Figure 1:
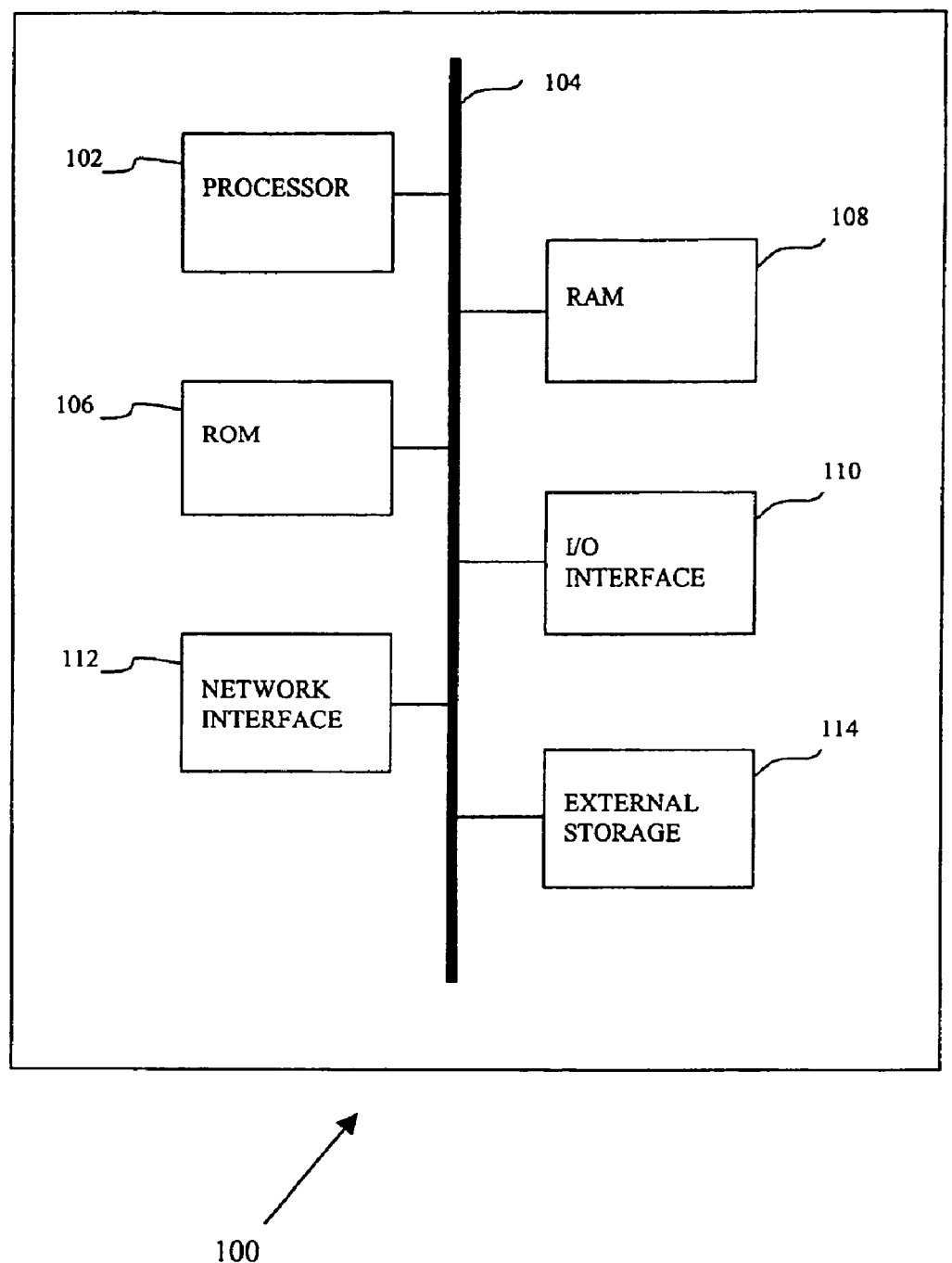
FIG. 1 is a block diagram of a computer processing system to which the present invention may be applied.

As depicted in FIG. 1, a computer system 100 includes at least one processor (hereinafter processor) 102 operatively coupled to other components via a system bus 104. A read-only memory (ROM) 106, a random access memory (RAM) 108, an I/O interface 110, a network interface 112, and external storage 114 are operatively coupled to the system bus 104. Although not shown, it is to be understood that the RAM 108 includes operating system software and software of the invention. Representative operating systems include Microsoft WINDOWS, LINUX and UNIX.

Various peripheral devices such as a display device, a disk storage device (e.g., a magnetic or optical disk storage device), a keyboard, and a mouse, may be operatively coupled to the system bus 104 by the I/O interface 110 or the network interface 112.

The computer system 100 may be a standalone system or be linked to a network via the network interface 112. The network interface 112 may be a hard-wired interface. However, in various exemplary embodiments, the network interface 112 can include any device suitable to transmit information to and from another device, such as a universal asynchronous receiver/transmitter (UART), a parallel digital interface, a software interface or any combination of known or later developed software and hardware. The network interface may be linked to various types of networks, including a local area network (LAN), a wide area network (WAN), an intranet, a virtual private network (VPN), and the Internet.

The external storage 114 may be implemented using a database management system (DBMS) managed by the processor 102 and residing on a memory such as a hard disk. However, it should be appreciated that the external storage 114 may be implemented on one or more additional computer systems.

Those skilled in the art will appreciate that other alternative computing environments may be used without departing from the spirit and scope of the present invention.

Figure 2:
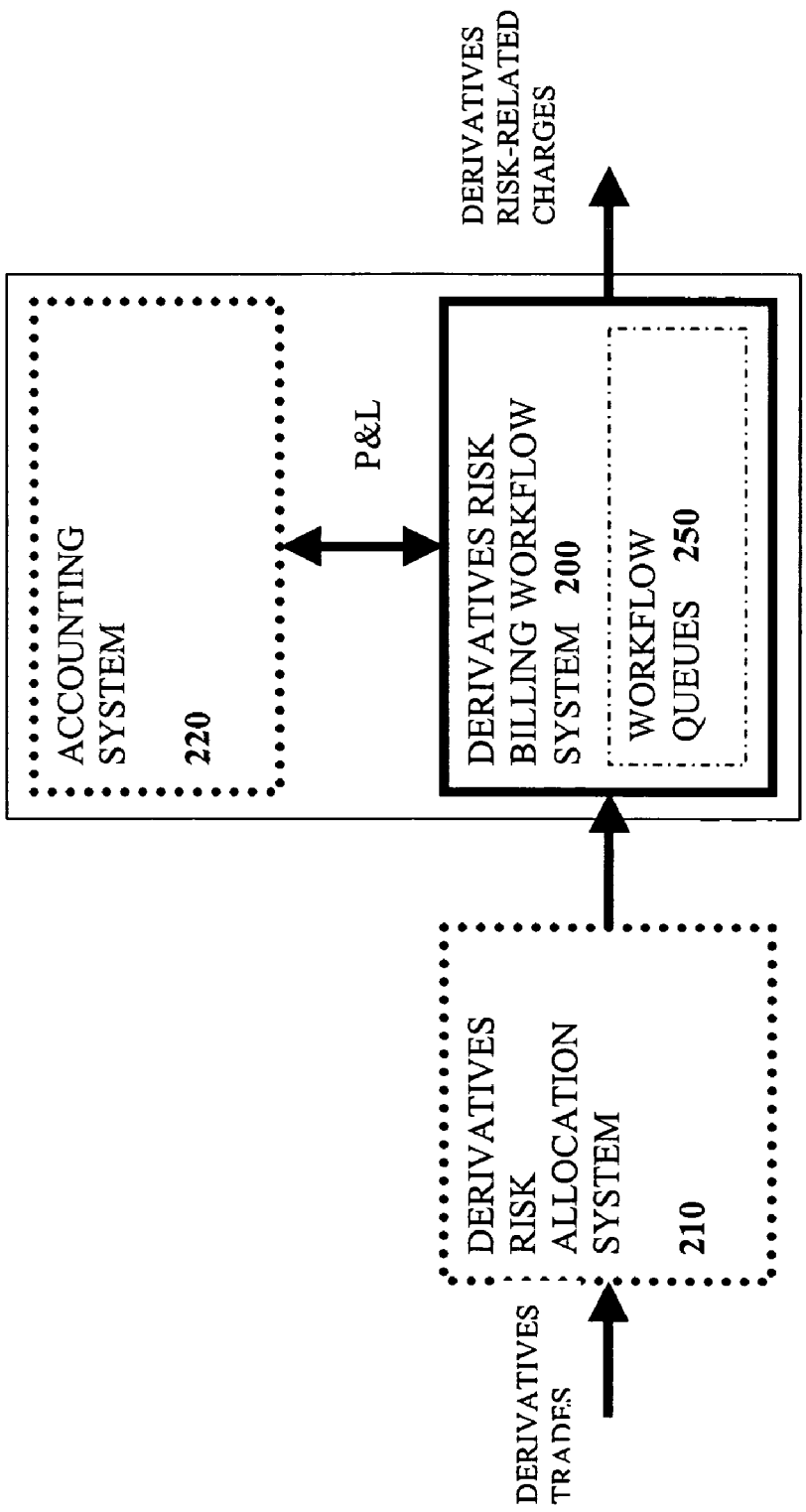
FIG. 2 is a block diagram showing an exemplary billing workflow for billing credit charges to entities executing derivatives.

FIG. 2 illustrates an exemplary system for billing credit charges to entities trading derivatives. As depicted, a Derivatives Risk Allocation System 210 receives derivative trade information and calculates a credit valuation adjustment (CVA) amount for the trade. In general, the CVA is based on an estimation of exposure to counterparty default. This estimation of exposure to counterparty default is calculated using a complex Monte Carlo methodology modeled over the projected life of the trade. The Derivatives Risk Billing Workflow System 200 receives the calculated CVA, and can interact with an Accounting System 220 in order to make appropriate Profit and Loss (P&L) entries for the CVA. The Accounting System 220 is integrated with the Derivatives Risk Billing Workflow System 200. (Alternatively, the Accounting System 220 could exist as a separate system). The CVA amounts are billed to the business units which actually caused the risk and appear on billing reports.

Figure 3:
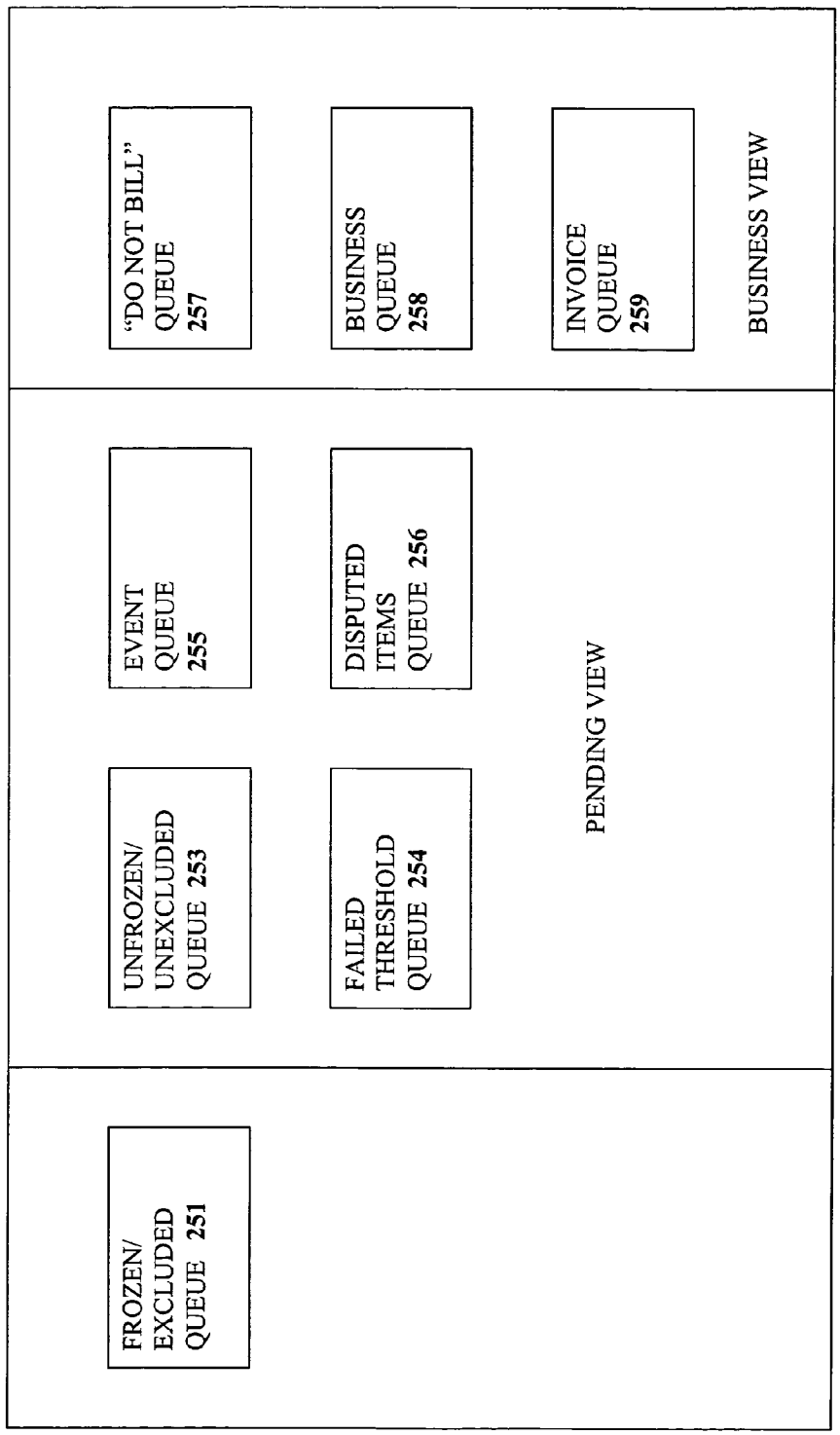
FIG. 3 illustrates various exemplary workflow queues that may be used in conjunction with the system shown in FIG. 2.

Advantageously, the Derivatives Risk Billing Workflow System 200 includes a plurality of Workflow Queues 250 (shown in detail in FIG. 3) for holding an item for further review (or other purposes). As an item makes it way through the billing workflow, it may be slotted in one or more of the Workflow Queues 250 where further action will take place. This arrangement allows various employees to review credit charges to determine whether they are appropriate, and to make adjustments before the CVA is actually billed. Also, as mentioned, accounting adjustments for Profit and Loss (P&L) can also be automatically made.

As discussed above, once a derivatives trade is executed, the relative risk of the trade to the institution can be assessed, and an amount of risk-related reserve determined. For various reasons, this CVA may not be the actual amount billed. For example, the amount calculated may be disputed by a client or it may be deemed as being invalid. The present invention allows for additional levels of review, as well as for additional checks to be made before the bill is actually sent out.

As an initial matter, trade information can be checked to determine whether the trade is "frozen" or "excluded". In general, a trade will be considered frozen or excluded based on its Universal Counterparty Number (UCN). The UCN can represent an individual legal entity, commercial grouping or commercial entity. Frozen trades can occur for many reasons (e.g., certain internal counter parties, temporary data quality issues). Counter parties can be marked as excluded for various reasons (e.g. counter party risk managed in a more specialized book).

If it is determined that the trade is "frozen" or "excluded", the calculated CVA will be held in the Frozen/Excluded Queue 251. The trade will be held until its UCN becomes unfrozen or removed from the excluded list. In that case, the trade will be moved to the Unfrozen/UnExcluded Queue 253. As with the other queues, this Unfrozen/UnExcluded Queue 253 is intended to be "viewable". That is, the contents of the queue may be browsed, or otherwise outputted, to appropriate personnel. For example, a user in the Accounting Department may use an on-line screen to examine the contents of the viewable queue. The user may adjust the content of the queue, or to take other specified action.

Assuming that the trade is not "frozen" or "excluded", the CVA is assessed to determine whether it exceeds a predefined threshold amount. Trades that exceed the predefined threshold amount will be routed to a Failed Threshold Queue 254. Items in the Failed Threshold Queue 254 will be examined to determine whether the credit amount generated is indeed invalid. If the credit amount is determined to be valid, the credit amount will flow to the Business Queue 258. As will be discussed in more detail, items in the Business Queue 258 will eventually be routed to an Invoice Queue 259, and then appear on the billing statement. If the credit amount is not deemed valid, however, the amount will be reversed and forwarded to the Do Not Bill Queue 257. P&L for items in the Failed Threshold Queue 254 will be posted as "pending" until released to the Business Queue 258 or the Do Not Bill Queue 257. A "pending" indicator can be associated with these trades, for example.

Trades that have an event log that has been triggered will appear in an Event Queue 255 for analysis. The trigger can be a specified date or an event associated with a trader (e.g., an edit or unwind). A diary system will preferably be maintained to prompt users to do and record certain tasks, and to remind users of overdue tasks. For example, the diary might remind certain users that a trade has been moved to a queue for review by a specific department, and, if they have not reviewed this matter after a certain number of days, an email reminder would be sent.

Items that are being disputed can be sent to the Disputed Items Queue 256. For example, if a business unit does not agree with a particular charge in the Business Queue 258, the business unit can flag the item (using an on-line screen, for example), and add a comment including a reason for the disagreement. The flagged item can be reviewed to determine whether the item should be routed to the Disputed Items Queue 256 for further review. P&L for items in the Disputed Items Queue 256 will be reversed and posted as "pending" until released to the Business Queue 258 or the "Do Not Bill" Queue 257. The "pending" indicator can also be used for trades in the Disputed Items Queue 256.

Items will flow to the "Do Not Bill Queue" 257 when the amount will not be charged. Trades can be sent to "Do Not Bill Queue" 257 from the Unfrozen/Unexcluded Queue 253, the Failed Threshold Queue 254, the Disputed Items Queue 256, or the Business Queue 258. Any pending P&L will be reversed once items are designated "Do Not Bill".

Contents of the Business Queue 258 may be viewed using any suitable means, such as, for example, a screen including a drop-down menu where each business unit is able to retrieve only items related to its particular business. Trades that pass the threshold check will generally flow directly to the Business Queue 258. At that point, P&L will be directly posted. Trades that have been in the Unfrozen/Unexcluded Queue 253, the Failed Threshold Queue 254, or the Disputed Items Queue 256 can be sent to the Business Queue 258 after review, and P&L will be posted for these items. Trades that are in the Business Queue 258 can also be moved to the "Do Not Bill" Queue 257. This will cause P&L to be reversed and show a zero charge amount.

As mentioned, once items reach the Business Queue 258, the business units will be able to review them. If a business unit disagrees with a charge, the business unit will have the ability to flag that item along with a comment about the reason for the dispute. Flagged items will be reviewed to decide whether to send the trade to the Disputed Items Queue 256 for further review. P&L will be reversed for these deals and classified as pending. If the dispute is deemed invalid, an explanation may be associated with the item for the business unit to review. These trades will flow to the Invoice Queue 259.

Items that have entered the Business Queue 258 will be sent to the Invoice Queue 259 at the end of the billing period (except for those items that are sent back to the Disputed Items Queue 256 for further review). Preferably, invoices will be arranged by business unit, reflecting the following column screen headers:

1. Total Gross Credit Amount
2. Adjustments
3. Net Credit Amount
4. Post-billing adjustment
5. Proxy Re-balancing
6. Collateral/Netting rebates/charges
7. Miscellaneous adjustments
8. Total billed amount. Preferably, clicking on the Total Billed Amount column will provide details relating to that trade.
9. Editable Entry for the business unit to enter an expected amount to pay/receive
10. Editable Entry for Accounting/Control to enter the amount actually received/paid
11. Column/Field reflecting an outstanding amount (i.e., difference between the total bill amount and the amount that Accounting/Control indicated was actually received/paid).
12. Invoice Number.

Of course, the invoice may instead, or additionally, be outputted as a printed report.

It is to be appreciated that the above describes a somewhat simplified billing system. The system described above is meant to be illustrative of various embodiments of the present invention.

The invention will be clarified by the following examples.

EXAMPLES

1. Trade on Frozen List

In this case, the system recognizes the trade as having a frozen UCN. The trade is then routed to the Frozen/Excluded Queue 251 where it remains until "un-frozen". The trade does not impact P&L and does not appear in the month's billing. Once the UCN is unfrozen, all bills generated during the frozen period will be reviewed to determine whether charges should be applied to the business unit. If the items that are being billed are items that originated in a prior month, they can be billed as "Post Bill Adjustments" in the current month.

2. Credit Valuation Amount Exceeds Threshold

The CVA associated with a trade will be checked to determine whether it exceeds a predefined threshold amount (e.g., $100,000). In this case, the trade will be routed to the Failed Threshold Queue 254. The charge will then be analyzed to determined whether it is valid or not. The credit amount can either be forwarded as billed, adjusted, or zeroed out. P&L will be posted as pending until the item is routed to the Business Queue 258 or the "Do Not Bill Queue 257.

3. Invoiced Trade From Prior Month is Contested by Business Unit

Let us assume that the trade resided in the Invoice Queue 259 and the business unit decided to make an adjustment. If it is agreed that the adjustment should be made, the trade will be moved to the Disputed Items Queue 256. This will cause P&L to be reversed for the month it was "earned" and classified as a "Post-Bill adjustment." This P&L amount will be pending while the item remains in the Disputed Items Queue 256. Once the adjustment is made, the trade will be sent back to the Business Queue 258, posting the new amount. The net between the reversal and the new amount will be reflected in the "P&L—Post-Bill Adjustment" column and recognized in the current month.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer system for allocating charges related to derivatives trading to a business unit in a business organization, comprising:
   a computer memory configured to receive reserve amount information based on an exposure associated with a derivative trade; and
   a computer processor operatively coupled to the computer memory, the computer processor configured to review the derivative trade and the reserve amount information and allocate a risk-related charge based on the reserve amount information to a business unit involved in the derivative trade for processing by at least one of a plurality of workflow queues, wherein the computer processor includes an accounting component for posting Profit and Loss (P&L) amounts based on the reserve amount information.

2. The system of claim 1, wherein the reserve amount information includes a reserve amount to set aside.

3. The system of claim 2, wherein the reserve amount is based on an estimation of risk of counter-party default.

4. The system of claim 1, wherein the reserve amount is held in a special queue for further review, if the reserve amount exceeds a predetermined amount.

5. The system of claim 1, wherein at least one of the plurality of queues is viewable by a user via an interface.

6. The system of claim 5, wherein at least one of the viewable queues is modifiable.

7. The system of claim 1, wherein a reserve amount found to be invalid is reversed.

8. The system of claim 1, wherein the computer processor is configured to generate an invoice associated with the risk-related charge for the business unit involved in the derivative trade.

9. A method for allocating charges related to derivatives trading to a business unit in a business organization, comprising:
   receiving, by a computer processor, reserve amount information based on an exposure associated with a derivative trade;
   identifying, by the computer processor, a business unit creating the exposure associated with the derivative trade;
   reviewing, by the computer processor, the derivative trade and the reserve amount information;
   allocating, by the computer processor, a risk-related charge based on the reserve amount information to the business unit creating the exposure for processing by at least one of a plurality of workflow queues; and
   posting, by the computer processor, a Profit and Loss (P&L) amount for the derivative trade.

10. The method of claim 9, wherein the reserve amount information includes a reserve amount to set aside.

11. The method of claim 10, wherein the reserve amount is based on an estimation of risk of counter-party default.

12. The method of claim 10, wherein the reserve amount is held in a special queue for further review, if the reserve amount exceeds a predetermined amount.

13. The method of claim 9, wherein at least one of the plurality of queues is viewable by a user via an interface.

14. The method of claim 13, wherein at least one of the viewable queues is modifiable.

15. The method of claim 10, further including the step of reversing the reserve amount, if the reserve amount is invalid.

16. The method of claim 9, further including the step of generating an invoice for the business unit creating the exposure.

17. A program storage device readable by a machine, tangibly embodying a program of instructions executable on the machine to perform method steps for allocating charges to a business unit within a business organization, the method steps comprising:
   receiving reserve amount information based on an exposure associated with a derivative trade;
   identifying a business unit creating the exposure associated with the derivative trade;
   reviewing the derivative trade and the reserve amount information;
   allocating a risk-related charge based on the reserve amount information to a business unit involved in the derivative trade for processing by at least one of a plurality of workflow queues; and
   posting a Profit and Loss (P&L) amount for the derivative trade.

* * * * *